(12) United States Patent
Drewes et al.

(10) Patent No.: US 9,511,641 B2
(45) Date of Patent: Dec. 6, 2016

(54) AXLE CONNECTION

(71) Applicant: SAF-HOLLAND GmbH, Bessenbach (DE)

(72) Inventors: Olaf Drewes, Aschaffenburg (DE); Federik Biewer, Haibach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 14/904,218

(22) PCT Filed: Sep. 3, 2014

(86) PCT No.: PCT/EP2014/068684
§ 371 (c)(1),
(2) Date: Jan. 11, 2016

(87) PCT Pub. No.: WO2015/036294
PCT Pub. Date: Mar. 19, 2015

(65) Prior Publication Data
US 2016/0137015 A1   May 19, 2016

(30) Foreign Application Priority Data
Sep. 10, 2013 (DE) .................. 10 2013 218 028

(51) Int. Cl.
*B60G 7/00* (2006.01)
*B60G 9/00* (2006.01)
*B60B 35/00* (2006.01)

(52) U.S. Cl.
CPC .............. *B60G 7/008* (2013.01); *B60B 35/006* (2013.01); *B60G 9/003* (2013.01);
(Continued)

(58) Field of Classification Search
CPC ............ B60B 2900/351; B60B 35/006; B60B 35/007; B60B 35/008; B60G 9/003; B60G 7/008; B60G 2200/31; B60G 2204/126; B60G 2204/148; B60G 2204/4306; B60G 2206/011; B60G 2206/012; B60G 2206/11; B60G 2206/32; B60G 2206/82; B60G 2206/8201; B60G 2300/026
See application file for complete search history.

(56) References Cited

U.S. PATENT DOCUMENTS 3,332,701 A * 7/1967 Masser .................. B60G 9/003
267/256
4,541,653 A * 9/1985 Raidel .................... B60G 9/003
280/124.109
(Continued)

FOREIGN PATENT DOCUMENTS

DE   10 2006 015 671   10/2007
DE   20 2008 014 426    4/2009
(Continued)

OTHER PUBLICATIONS

European Patent Office, International Search Report, Oct. 27, 2014.

*Primary Examiner* — Laura Freedman
(74) *Attorney, Agent, or Firm* — Price Heneveld LLP

(57) ABSTRACT

An axle connection, in particular for a utility vehicle, includes an axle tube receptacle which has a longitudinal axis which is oriented parallel to an axle tube arrangeable thereon, at least one connecting region, in particular for connection to a longitudinal link, and a support section, in particular for the arrangement of a tail end, wherein the axle connection has an axis of rotation which intersects the longitudinal axis, the connecting region is configured symmetrically with respect to a plane of rotation which is spanned by the axis of rotation and the longitudinal axis, and wherein the support section is offset transversely with respect to the plane of rotation at least in regions.

24 Claims, 5 Drawing Sheets

(52) U.S. Cl.
CPC .... *B60B 2900/351* (2013.01); *B60G 2200/31* (2013.01); *B60G 2204/126* (2013.01); *B60G 2204/148* (2013.01); *B60G 2204/4306* (2013.01); *B60G 2206/011* (2013.01); *B60G 2206/012* (2013.01); *B60G 2206/11* (2013.01); *B60G 2206/32* (2013.01); *B60G 2206/7101* (2013.01); *B60G 2206/7102* (2013.01); *B60G 2206/72* (2013.01); *B60G 2206/8107* (2013.01); *B60G 2206/81022* (2013.01); *B60G 2206/8201* (2013.01); *B60G 2300/026* (2013.01)

(56) References Cited

U.S. PATENT DOCUMENTS

| | | | | |
|---|---|---|---|---|
| 5,037,126 A * | 8/1991 | Gottschalk | ............ | B60G 9/003 280/124.116 |
| 5,127,668 A * | 7/1992 | Raidel | ............ | B60G 7/02 280/124.116 |
| 5,375,871 A * | 12/1994 | Mitchell | ............ | B60G 7/001 280/124.116 |
| 6,152,486 A * | 11/2000 | Pierce | ............ | B60G 17/005 280/755 |
| 6,241,266 B1 * | 6/2001 | Smith | ............ | B60B 35/04 280/124.116 |
| 6,471,223 B1 * | 10/2002 | Richardson | ............ | B60G 7/001 280/124.116 |
| 6,508,482 B2 * | 1/2003 | Pierce | ............ | B60G 7/001 280/124.116 |
| 6,834,874 B1 * | 12/2004 | Overby | ............ | B60G 3/16 280/124.116 |
| 6,840,525 B1 * | 1/2005 | Griffiths | ............ | B60G 9/003 267/256 |
| 7,007,960 B2 * | 3/2006 | Chalin | ............ | B60G 11/27 280/124.116 |
| 7,048,288 B2 * | 5/2006 | Chan | ............ | B60G 9/003 280/124.11 |
| 7,086,655 B2 * | 8/2006 | Chan | ............ | B60G 7/001 280/124.116 |
| 7,210,692 B2 * | 5/2007 | Galazin | ............ | B60G 7/006 280/124.1 |
| 7,900,942 B2 * | 3/2011 | Koschinat | ............ | B60G 7/001 280/124.111 |
| 8,006,987 B2 * | 8/2011 | Saieg | ............ | B60G 9/003 280/124.116 |
| 8,678,407 B2 * | 3/2014 | Eveley | ............ | B60G 7/001 280/124.11 |
| 8,770,604 B2 * | 7/2014 | Brereton | ............ | B60G 7/001 280/124.108 |
| 8,910,961 B2 * | 12/2014 | Galazin | ............ | B60G 9/003 280/124.128 |
| 8,998,229 B2 * | 4/2015 | Michel | ............ | B60G 5/06 280/124.116 |
| 2011/0057408 A1 * | 3/2011 | Koschinat | ............ | B60G 35/08 280/124.11 |
| 2013/0197756 A1 | 8/2013 | Ramirez Ruiz | | |
| 2015/0054245 A1 * | 2/2015 | Drewes | ............ | B60G 9/003 280/124.111 |

FOREIGN PATENT DOCUMENTS

| | | |
|---|---|---|
| DE | 10 2008 053 886 | 5/2009 |
| DE | 10 2011 086 480 | 5/2013 |
| GB | 2396140 | 6/2004 |
| WO | WO 0046052 A1 * | 8/2000 ............ B60B 35/08 |
| WO | 02 20288 | 3/2002 |
| WO | 2008017351 | 2/2008 |

* cited by examiner

AXLE CONNECTION

BACKGROUND OF THE INVENTION

The present invention relates to an axle connection, in particular for a utility vehicle.

An axle connection describes the junction between a longitudinal link or trailing arm, in particular of a utility vehicle, and an axle tube. As a matter of course, in most cases, two axle connections are provided since the axle tube is usually guided by two longitudinal links. At the respective ends of the axle tube, there are usually provided axle stubs or alternative suitable attachments in order to fix the brake units and the wheels. In the area of the axle connection, there are generally also provided components or devices for arranging spring/damper components, such as air spring elements. The component, on which the air spring element is arranged, is usually referred to as "tail end" in the prior art. Due to the different functionalities integrated into the axle connection, said junctions are often very complex from a constructive point of view and, consequently, they are also made to be inflexible. Thus, for example, different longitudinal links have to be stored by the manufacturers in case air spring elements with different installation heights are to be mounted. Such a variety of variants is always disadvantageous when it comes to costs.

Therefore, the object underlying the present invention is to provide an axle connection, in particular for a utility vehicle, which is inexpensive while offering the highest degree of flexibility.

SUMMARY OF THE INVENTION

According to the invention, an axle connection, in particular for a utility vehicle, comprises an axle tube receptacle, which has a longitudinal axis, which is oriented parallel to an axle tube arrangeable thereon, at least one connecting region, in particular for connection to a longitudinal link, and a support section, in particular for the arrangement of a tail end, wherein the axle connection has an axis of rotation, which intersects the longitudinal axis, and wherein the connecting region is formed or arranged or positioned symmetrically with respect to a plane of rotation, which is spanned by the axis of rotation and the longitudinal axis, wherein the support section is offset transversely with respect to the plane of rotation at least in regions. Advantageously, the longitudinal axis corresponds to a central line or cylinder axis of the axle tube, which is usually round, in particular circular. As a matter of course, the axle tube may also be formed with a polygonal or angled cross-section, at least in regions. Irrespective of the shape of the axle tube, the axle tube receptacle is adapted to be arranged with its inner surface at or on the axle tube in a form-fitting manner at least in regions. Expediently, the axle tube receptacle thus encloses the axle tube at least in regions so that it is possible to accommodate or arrange the axle tube in or on the axle tube receptacle in a form-fitting and/or force-fitting manner. Alternatively preferably, the axle tube receptacle encloses the axle tube not completely, but is arranged "to butt" or to "block", wherein it is welded, for example. Advantageously, the axle connection comprises the at least one connecting region, in particular to form a connection with the longitudinal link and the support section, in particular in order to arrange the tail end. With reference to the longitudinal axis, the connecting region and the support section are arranged substantially opposite each other or extend substantially away from each other. Advantageously, the connecting region is adapted for a form-fitting and/or force-fitting connection with the longitudinal link. For example, the connecting region is designed such that it is quickly and easily possible to weld the connecting region and the longitudinal link. Preferably, to this end, the connecting region already comprises suitable beveled surfaces at its edges, so that it becomes possibly easier to make a fillet weld. Advantageously, the connecting region is positioned symmetrically relative to the plane of rotation, wherein the plane of rotation is spanned by the axis of rotation and the longitudinal axis. Here, axis of rotation means that the axle connection may turned by 180° about the axis of rotation in order to bring it from a first mounting state into a second mounting state. Advantageously, to this end, the connecting region is positioned symmetrically relative to the plane of rotation. Since the support section is offset transversely with respect to the plane of rotation at least in regions, various positions of the support section may be realized when rotating the axle connection about the axis of rotation from the first into the second mounting state. Advantageously, in this manner it is realized that the support section is offset transversely with respect to the plane of rotation, as has already been mentioned. As a matter of course, the support section may be located also at least in regions on the axis of rotation or in the plane of rotation, when the support section is formed at least partially asymmetrically relative to the plane of rotation. Alternatively, the support section may also be formed symmetrically relative to the plane of rotation, when it is offset in its position relative to the plane of rotation. Particularly preferably, the support section, is both formed asymmetrically relative to the plane of rotation and arranged offset relative to the plane of rotation. From the prior art, such axle connections are not known so that the various advantages and features, which the axle connections have, are attributed to other parts or components in most cases. This leads e.g. to the most different variants of longitudinal links, which may be reduced by using the axle connection(s). The number of variants of axle connections themselves may advantageously be kept as small as is possible, since they may be brought from a first mounting state into a second mounting state, resulting in different possibilities of arranging the tail end using one and the same axle connection.

Advantageously, the axle tube receptacle is formed as a cylinder, which is preferably completely closed at least in regions and which extends at least in regions along the longitudinal axis. As has already been indicated, the cylinder may have various cross-sections. However, a round, in particular a circular cross-section of the cylinder is particularly preferred. Nevertheless, there are also angled axle tubes, for example, so that for these applications also the axle tube receptacle may be formed angled or polygonal. The "at least in regions" is to be interpreted such that along the circumference of the cylinder, advantageously one or several holes may be provided, which advantageously may be used to weld the axle connection, and in particular the axle tube receptacle and the axle tube. Advantageously, between the axle tube and the axle tube receptacle, a plug weld is generally formed, so that the heat input into the axle tube during welding may be reduced since the axle tube need not be welded to the axle tube receptacle over the entire circumference thereof. Here, the cylinder need not be strictly cylindrical along the longitudinal axis. Rather, the cylinder may also have recesses, protuberances or the like preferably along the longitudinal axis, so that under certain circumstances the force transmission into the axle tube is further improved. The protuberances may be formed as polygonal or hyperbolic transitions, which allow for a force transmission from the axle tube into the axle tube receptacle and vice versa occurring with regard to the loads occurring.

Also preferably, the axle tube receptacle is formed as a substantially cylindrical wrap, extending at least in regions along the longitudinal axis. Advantageously, thus, the axle tube receptacle does not entirely surround the axle tube in the circumferential direction. Depending on the requirements, the most different angles of enlacement are conceivable. An angle of enlacement of <180° offers the great advantage that the axle tube may be arranged very easily in the axle tube receptacle or in the (cylindrical) wrap.

Generally, the axle connection may be formed as a hollow body at least in the region of the axle tube receptacle. To put it differently, the axle connection may comprise the cylinder or also the substantially cylindrical wrap. Alternatively preferably, the axle tube receptacle may also be formed by respective openings in the hollow body, wherein the openings enclose the axle tube completely or also only partially. The openings with their respective inner surfaces represent then the axle tube receptacle. In this variant, however, only a linear contact is realized between the axle tube and the axle tube receptacle, unless further elements are provided for fixing the axle tube to the axle tube connection.

As has already been indicated, the axle tube receptacle advantageously has at least one inner surface and/or at least one lateral contour for arranging the axle tube and/or an axle stub. Advantageously, at one or both lateral contours, the axle connection may have a flange or the like, for example, adapted for arranging in and/or on an axle tube or in and/or on an axle stub. Advantageously, by means of the flange, the various components may be centered relative to each other. The components are then actually fixed advantageously by means of circumferential welding. As a matter or course, the reverse is also possible, i.e. that the axle tube and/or the axle stub have a flange or the like. Generally, the most diverse combinations are conceivable. For example, the axle tube may be arranged on the axle connection also by means of the inner surface of the axle tube receptacle, while at the same time the axle stub is arranged on the lateral contour etc.

Expediently, the connecting region is at least one region of the axle tube receptacle. Thus, for example, advantageously, the longitudinal link may be arranged, in particular welded, directly onto the axle tube receptacle, which advantageously is then accordingly reinforced in said region. Here, the axle tube receptacle may be formed as a cylinder, which is closed at least in regions, or as a substantially cylindrical wrap. Advantageously, the connecting region may be formed both on an outer contour of the axle tube receptacle and it may be formed by the edges of the axle tube receptacle, such as in case the latter is formed as a cylindrical wrap. Advantageously, the edges of the axle tube receptacle are then located such that they are positioned symmetrically relative to the plane of rotation.

Expediently, the connecting region is formed as a continuation, extending along the axis of rotation away from the axle tube receptacle. Advantageously, the continuation may be a hollow body, which is substantially closed. Preferably, the continuation or the hollow body allows for a kind of transition to a geometry or to a cross-section of the longitudinal link to be arranged. Advantageously, the longitudinal link and the continuation are connected in a form-fitting and/or force-fitting manner, e.g. in that they are welded. The continuation itself may be formed one-piece with the axle tube receptacle. For example, the axle tube receptacle together with the continuation may be formed in a high-pressure forming process, for example. Alternatively preferably, the continuation may also be connected to, e.g. welded to the axle tube receptacle in a form-fitting and/or force-fitting manner.

Advantageously, the continuation has a connecting plane, which is oriented substantially transverse, in particular perpendicular to the axis of rotation. To put it differently, the connecting plane serves for arranging the longitudinal link or represents the interface. In order to be able to provide the "same" interface in both mounting states, the connecting plane is formed advantageously symmetrically relative to the plane of rotation or it is perpendicular thereto. Advantageously, the connecting region generally forms one connecting plane. Thus, for example two edges of the axle tube receptacle formed as a cylindrical wrap may form the connecting plane, on which the longitudinal link may then advantageously be arranged.

Advantageously, the connecting region and the axle tube receptacle are arranged substantially along the longitudinal axis offset relative to each other. Here, it has to be taken into account that the axis of rotation represents so to say a line of symmetry of the connecting region. This results already from the fact that the connecting region is positioned or formed symmetrically relative to the plane of rotation. If the axle tube receptacle is arranged along the longitudinal axis offset relative to the connecting region, this asymmetrical arrangement will result in different positions along the longitudinal direction of the axle tube receptacle in the first and in the second mounting state relative to the connecting region. Advantageously, this allows for an adaptation to the most different space conditions. Also advantageously, the support width on the axle tube may be varied, i.e. the axle tube may be connected to the longitudinal link at various sites, so that an influence may be exerted on the force transmission into the axle tube.

Advantageously, the support section is positioned substantially along the longitudinal axis offset with respect to the axis of rotation. Similar to the above-mentioned example, thus, in the first and in the second mounting position, different positions may be realized for the support section. As a matter of course, between the support section, the axle tube receptacle and the connecting region, all conceivable positions along the longitudinal axis are possible. As a matter of course, the connecting region, the axle tube receptacle and the support section may also be arranged parallel to the axis of rotation—on a line so to say. It is also possible that the connecting region, the axle tube receptacle and the support section may be arranged symmetrically with respect to the axis of rotation. The combinations mentioned do not represent an exhaustive enumeration.

As has already been mentioned, the axle connection or at least parts thereof may be formed by means of a high pressure forming process. As a matter of course, the axle connection may also be formed inexpensively as a welded construction. For example, the axle tube receptacle itself may be formed from several parts, which are accordingly welded to each other. Something similar applies to the support section or the connecting region formed as continuation.

As has already been mentioned, the axle connection may advantageously be arranged on the axle tube in two mounting states, wherein a first mounting state differs from a second mounting state in that the axle connection is rotated by an angle of about 180° about the axis of rotation, wherein the axle connection is adapted such that the connecting region is positioned in the same manner in the first and in the second mounting state. In that the support section is offset at least in regions transversely with respect to the plane of rotation and may be arranged additionally also substantially along the longitudinal axis offset with respect to the axis of rotation, advantageously the most different positions may be realized for the support section. Advantageously, in this way the tail end may be arranged both along the longitudinal axis and relative to a driving surface in the most different positions. The tail end is advantageously arranged in or on the support section, for example by means of a welded joint. The support section may also be formed such that it provides an interlock system for arranging the tail end. The tail end may thus also be plugged onto the support section and be fixed by means of suitable fasteners. Generally, the support section may have attachment openings for arranging suitable fasteners.

Advantageously, the support section extends along a support axis, wherein the support axis and the axis of rotation preferably form an angle of about 2-90°. Preferably, the support axis, together with the axis of rotation, forms an angle of about 8-60°, particularly preferably of about 15-45°. Here, the angle, when viewed from the support axis, is measured away from the connecting region in the direction of the axis of rotation.

Advantageously, the support section extends along the support axis away from the axle tube receptacle, wherein the support section has at least one support surface. When viewed transverse to the support axis, the support section may have the most different cross-sections or outer contours. Advantageously, an angled, in particular a quadrangular shape is chosen. However, the cross-section may also be round, oval, or in particular also circular, depending on the shape and type of arrangement of the tail end. The at least one support surface is provided for arranging or supporting the tail end.

Expediently, two support surfaces run substantially parallel to the support axis, while one support surface runs substantially transverse to the support axis. Advantageously, the support surface, which runs substantially transverse to the support axis, may be used to support the tail end in the direction of the longitudinal axis. By contrast, the support surfaces, which run substantially parallel to the support axis, are used in order to support the tail end substantially transverse to the axis of rotation. Generally, the support section is adapted to arrange the tail end in a form-fitting and/or in a force-fitting manner. Thus, the tail end may be plugged onto the support section, for example, i.e. the tail end has a respective hollow, into which the support section may project. Also preferably, the tail end may also rest against the support section such that it may be welded to the support surfaces.

Advantageously, in the first mounting state, an upper support surface relative to the plane of rotation has the same angle with respect to the axis of rotation as a lower support surface relative to the plane of rotation in the second mounting state. Advantageously, thus, the upper and the lower support surfaces in both mounting states substantially have the same orientation relative to the longitudinal axis or to the axis of rotation, but differ in their heights, e.g. with respect to the driving surface. The same orientation of the support surfaces allows to use also the same tail ends. Thus, it is very advantageous that the variety of parts and variants may be further reduced. As a matter of course, also the support surface, which, as has been described above, is substantially transverse relative to the support axis, is positioned relative to the longitudinal axis or to the axis of rotation such that it has the same orientation at least in regions in both mounting states.

Expediently, the axle connection comprises an axle tube and/or an axle stub and/or a longitudinal link and/or a tail end. The axle connection thus need not be formed as a single component, but may be a part of any one of the above-mentioned components. Here, the axle connection may be a welded construction, either entirely or at least in part. Also the at least partial manufacture by means of a high-pressure forming process or a forging process is conceivable. Here, generally, the axle connection is preferably manufactured from steel. Alternatively, however, also other metal materials, e.g. aluminum, may be used. Also composite materials, in particular carbon-fiber materials, and combinations of the above-mentioned materials may advantageously be used, both for the axle connection and the components thereof and also for the longitudinal link, the tail end and the axle stub.

Further advantages and features become apparent from the following description of preferred embodiments of the axle connection according to the invention with reference to the appended Figures. Individual features of the individual embodiments may be combined with each other within the scope of the invention.

DETAILED DESCRIPTION OF THE PREFERRED EMBODIMENTS

Figure 1:
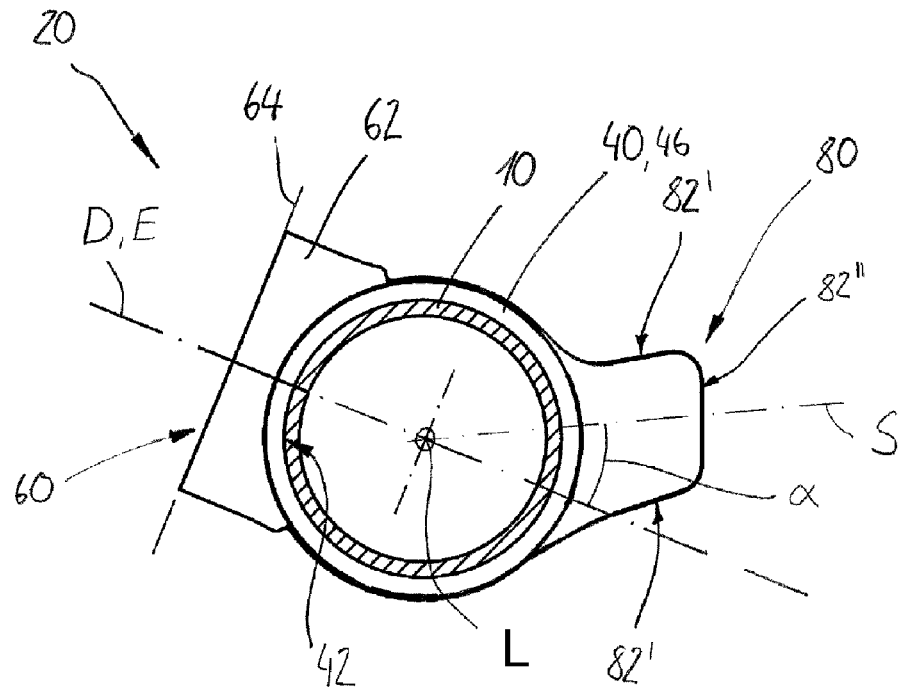
FIG. 1 shows a side view of a preferred embodiment of an axle connection with a connecting region formed as a continuation.

FIG. 1 shows a preferred embodiment of an axle connection 20 in a side view. An axle tube receptacle 40 is formed as a cylinder 46, in the inner surface 42 of which an axle tube 10 is arranged. Both the axle tube 10 and the axle tube receptacle 40 extend parallel to a longitudinal axis L, which so to say corresponds to a central line or cylinder axis (without reference sign) of the axle tube 10. Away from the axle tube receptacle 40 extends a connecting region 60 formed as a continuation 62, positioned symmetrically relative to a plane of rotation E. Furthermore, the connecting region 60 forms a connecting plane 64, substantially perpendicular to a plane of rotation E. The plane of rotation E is spanned by the longitudinal axis L and an axis of rotation D. Between the axis of rotation D and a support axis S, an angle $\alpha$ is formed, which is in a range of about 30°-60° in particularly preferred embodiments. Along the support axis S, a support section 80 extends, having several support surfaces 82', 82".

Figure 2:
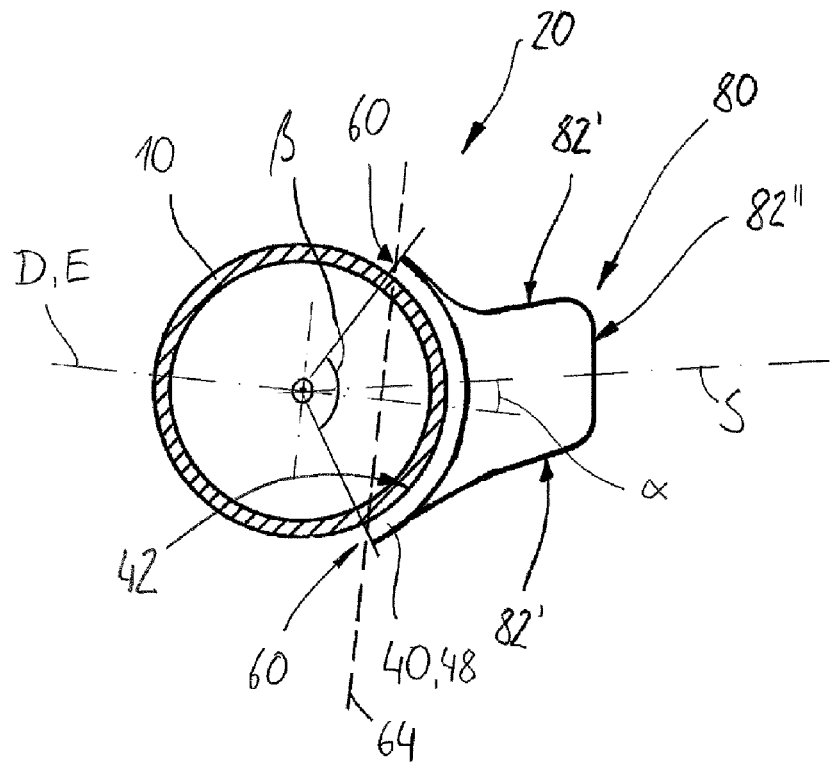
FIG. 2 shows a further preferred embodiment of an axle connection in a side view with an axle tube receptacle formed as a wrap.

FIG. 2 shows a further preferred embodiment of an axle connection 20 with an axle tube receptacle 40 formed as a wrap 48. The axle tube receptacle 40 forms an angle of enlacement β, which in the embodiment shown in FIG. 2 is in a range of about 100°-120°. An axle tube 10 is arranged on an inner surface 42 of the axle tube receptacle 40. The small angle of enlacement β of about 100°-120° allows to particularly easily arrange the axle tube 10 on the axle connection 20. The axle tube receptacle 40 formed as a wrap 48 forms a connecting region 60, comprising a connecting plane 64. The connecting plane 64 is formed by the edges of the wrap 48 so to say. It is decisive that the connecting plane 64 is oriented substantially perpendicular to a plane of rotation E or an axis of rotation D, as is the connecting region 60. A support section 80 with support surfaces 82', 82" extends away from the axle tube receptacle 40. The support section 80 is oriented along a support axis S, forming an angle α with the axis of rotation D.

Figure 3:
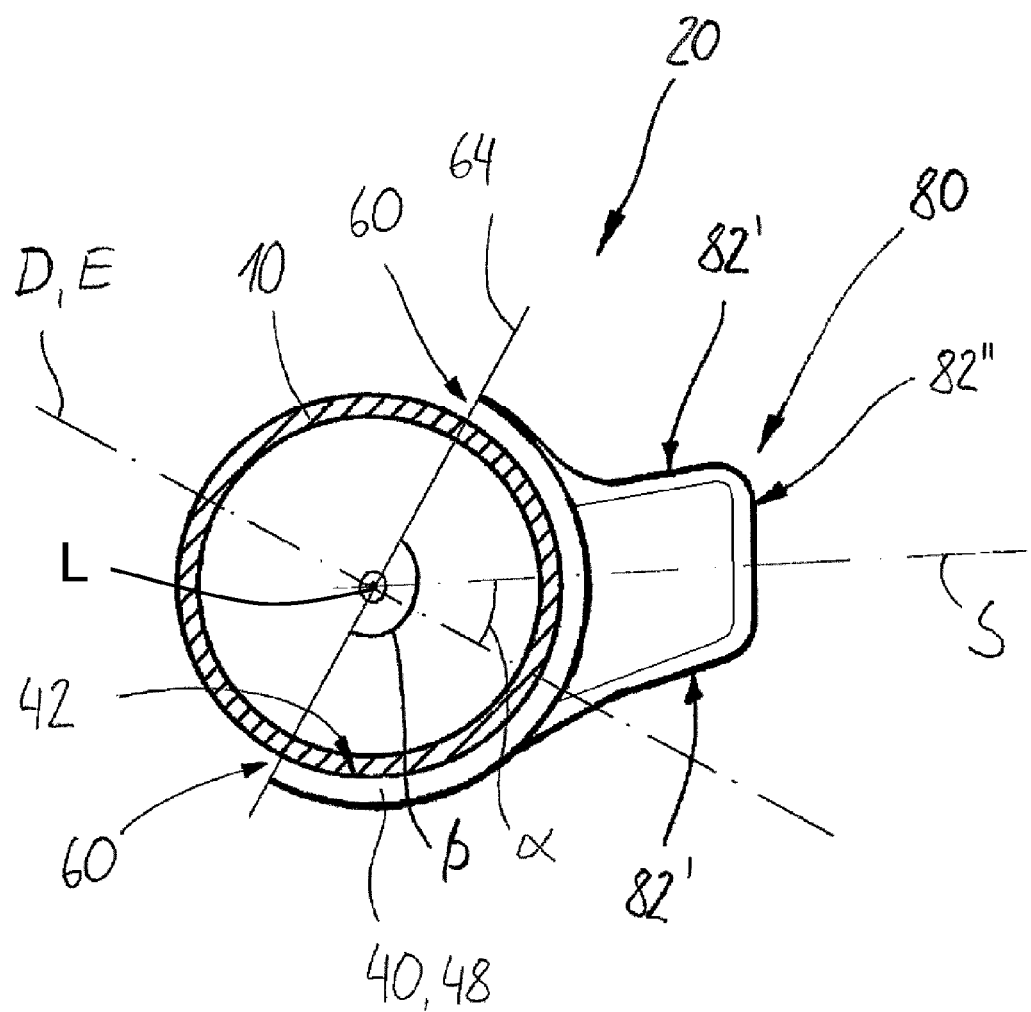
FIG. 3 shows a further preferred embodiment of an axle connection in a side view.

FIG. 3 shows a further preferred embodiment of an axle connection 20 in a side view. Also here, an axle tube receptacle 40 is formed as a wrap 48. Contrary to the embodiment in FIG. 2, a connecting region 60 has an angle of enlacement β of about 180°, so that a connecting plane 64 intersects a longitudinal axis L of the axle tube receptacle 40. An axle tube 10 is arranged on an inner surface 42 of the axle tube receptacle 40, wherein also here a very easy arrangement is made possible due to the angle of enlacement β of about 180°. The connecting plane 64 is approximately perpendicular to a plane of rotation E and an axis of rotation D, wherein the plane of rotation E is spanned by the axis of rotation D and the longitudinal axis L. Away from the axle tube receptacle 40, a support section 80 extends, having support surfaces 82', 82". The support section 80 extends along a support axis S, forming an angle α with the axis of rotation D.

Figure 4A:
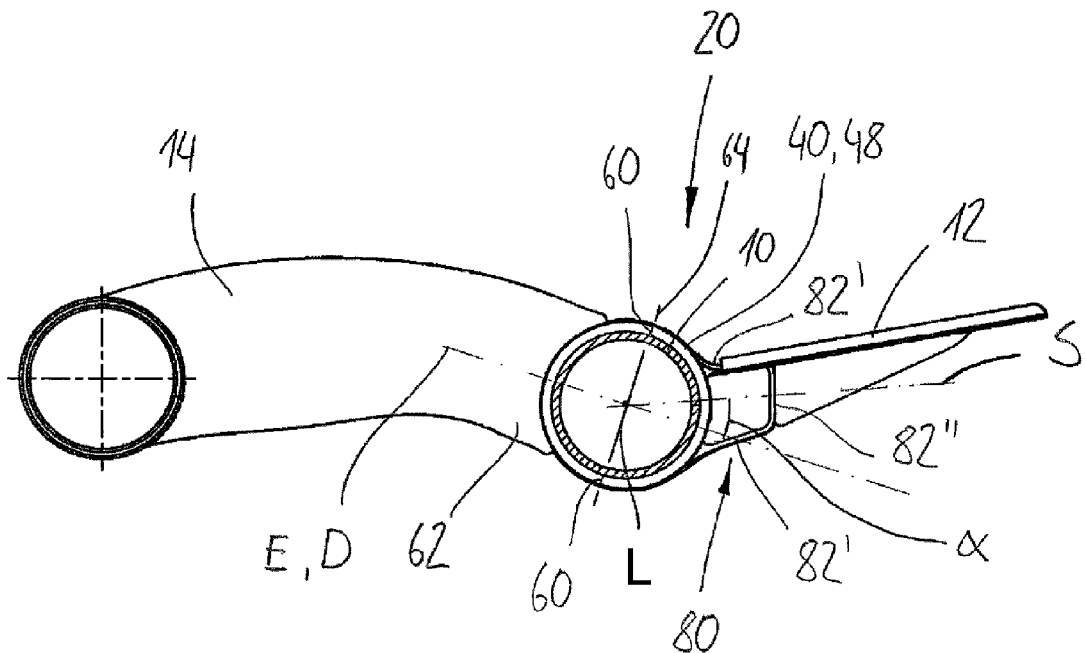
FIG. 4a shows a preferred embodiment of an axle connection with an axle tube receptacle formed as a wrap, connected to a longitudinal link in a first mounting position.

FIG. 4a shows a preferred embodiment of an axle connection 20 with an axle tube receptacle 40 formed as a wrap 48, on which receptacle there are arranged, on the one hand, a longitudinal link 14 on a connecting region 60 and, on the other hand, a tail end 12 on a support section 80. The tail end 12 rests against the support section 80 by means of the support surface 82', extending substantially along a support axis S, and against a support surface 82", extending substantially transverse to the support axis S. The support axis S forms an angle α with an axis of rotation D, standing transverse to a longitudinal axis L. The longitudinal axis L represents the cylinder axis of the axle tube 10. The longitudinal axis L and the axis of rotation D span a plane of rotation E, perpendicular to which a connecting plane 64 is positioned. Advantageously, the longitudinal link 14 and the axle connection 20 in the region of the connecting plane 64 or of the connecting region 60 are connected to one another, e.g. welded.

Figure 4B:
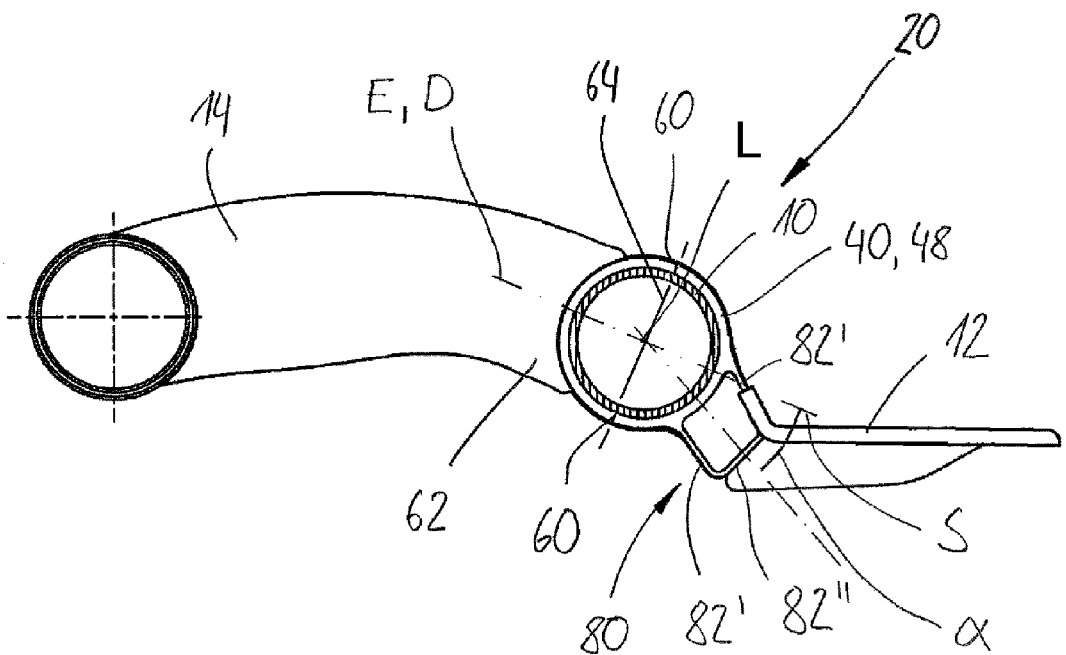
FIG. 4b shows the embodiment shown in FIG. 4a in a second mounting position.

FIG. 4b shows the embodiment of the axle connection 20 known from FIG. 4a, wherein FIG. 4b shows a second mounting state. The axle connection 20 known from FIG. 4a is arranged rotated by an angle of about 180° about the axis of rotation D. Advantageously, this has no effect on the positioning relative to the longitudinal link 14 since the connecting region 60 or the connecting plane 64 are formed symmetrically relative to the plane of rotation E. Only the position of the support section 80, which is arranged offset with respect to the plane of rotation E, is changed during the transition from the first mounting state into the second mounting state, such that different possibilities of positioning for the tail end 12 result.

Figure 5A:
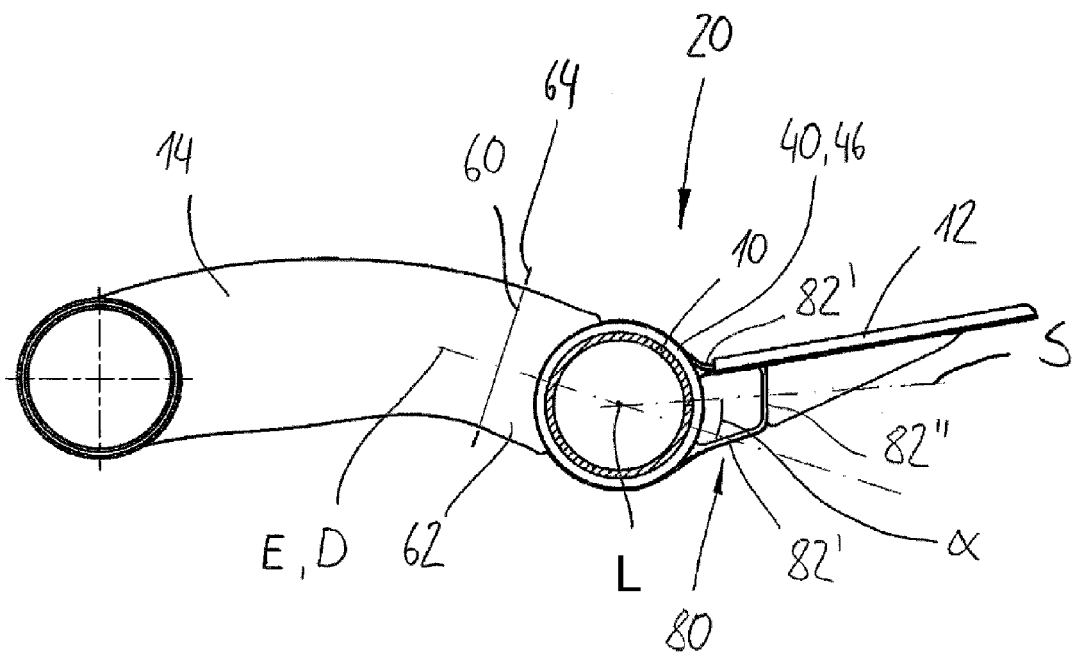
FIG. 5a shows a preferred embodiment of an axle connection with an axle tube receptacle formed as a cylinder in a first mounting position.

FIG. 5a shows a further preferred embodiment of an axle connection 20, which is connected to a longitudinal link 14 by means of a connecting region 60 and on which a tail end 12 is arranged on a support section 80. An axle tube receptacle 40 is here formed as a cylinder 46, from which a continuation 62 extends in the direction of the longitudinal link 14. The continuation 62 and the longitudinal link 14 are advantageously welded, for example, in the region of a connecting plane 64, or also plugged into each other and then welded. The connecting plane 64 is advantageously perpendicular to an axis of rotation D. Accordingly, the connecting region 60 is symmetrically positioned relative to a plane of rotation E, which is spanned by the axis of rotation D and a longitudinal axis L. Between the axis of rotation D and the support axis S, an angle α results, wherein the support surfaces 82' of the support section 80 extend substantially parallel to the support axis S, while a support surface 82" is positioned substantially transverse to the support axis S. Due to the differently positioned support surfaces 82', 82" manifold possibilities of supporting the tail end 12 result.

Figure 5B:
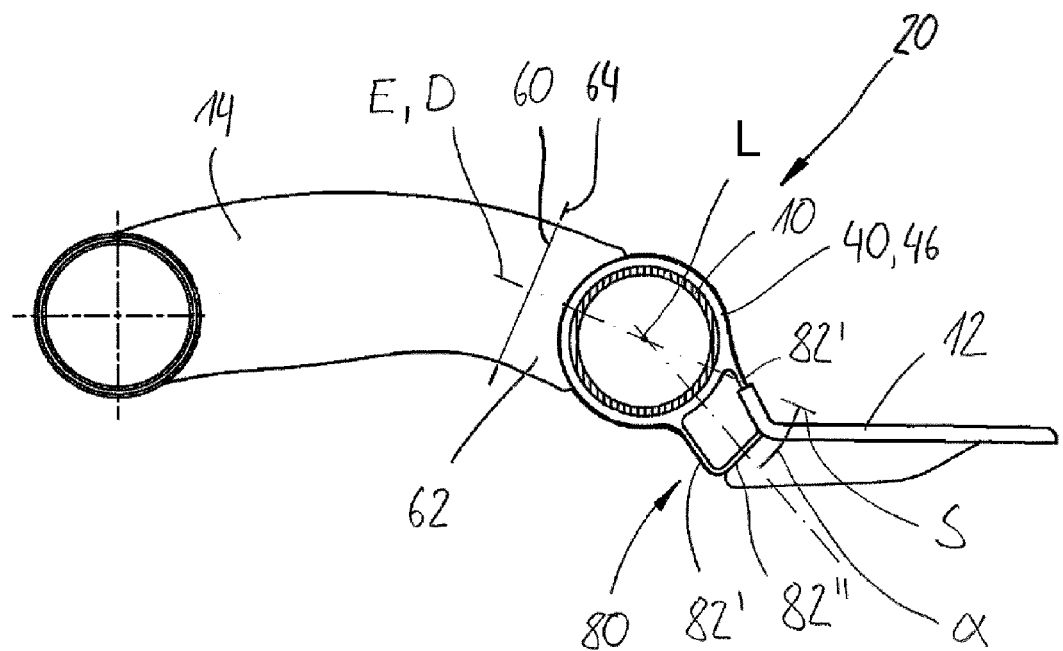
FIG. 5b shows the embodiment known from FIG. 5a in a second mounting position.

FIG. 5b shows the embodiment of the axle connection 20 known from FIG. 5a, wherein a second mounting state is shown here, in which the axle connection 20 is arranged rotated about the axis of rotation D by an angle of about 180° relative to the longitudinal link 14. Advantageously, this has no effect on the connection to the longitudinal link 14, since the connecting region 60 is arranged symmetrically relative to the plane of rotation E. Only the support section 80 is arranged offset with respect to the plane of rotation E and formed asymmetrically.

Figure 6:
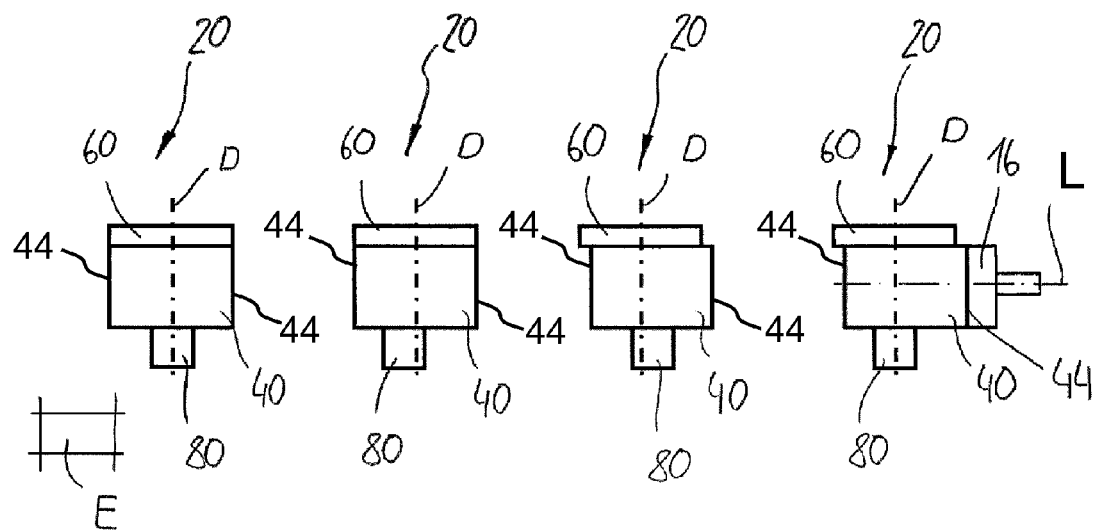
FIG. 6 schematically shows axle connections in a top plan view when seen relative to a plane of rotation E.

FIG. 6 shows a schematic representation of four axle connections 20 in a top plan view, relative to a plane of rotation E. In each case, there are shown a respective axis of rotation D and the positions of a connecting region 60, of an axle tube receptacle 40 and of a support section 80 thereto. Here, it should become clear that the axis of rotation D represents kind of a line of symmetry of the connecting region 60, while the axle tube receptacle 40 and the support section 80 with respect to each other, but also with respect to the connecting region 60, may be arranged in the most different positions relative to the axis of rotation D. The axle tube receptacles 40 have contours 44, on which e.g. axle stubs 16 or axle tubes 10 may be arranged. The rightmost embodiment of FIG. 6 schematically shows that the axle tube receptacle 40 laterally has a contour 44, on which e.g. an axle stub 16 is arranged. The axle stub 16 extends advantageously along a longitudinal axis L of the axle tube receptacle 40.

Figure 7:
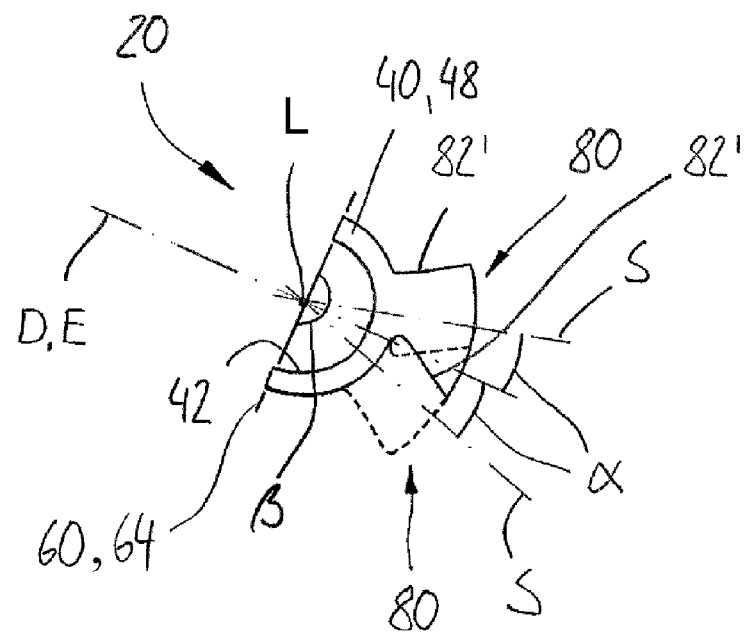
FIG. 7 shows a further embodiment of an axle connection in a side view.

FIG. 7 shows a further preferred embodiment of an axle connection 20 with an axle tube receptacle 40 formed as a wrap 48. A connecting region 60 forms an angle of enlacement β of about 180°, in order to arrange an axle tube (not shown here) on an inner surface 42 of the axle tube receptacle 40. A connecting plane 64 is perpendicular to an axis of rotation D. The axis of rotation D together with a longitudinal axis L forms a plane of rotation E. There is further shown a support section 80, extending away from the axle tube receptacle 40, in a first and in a second mounting state (shown in dashed lines). Here, the support section 80 or the support surfaces 82' thereof is/are formed such that the respective upper support surfaces 82' in both mounting states have substantially the same orientation, allowing for the use of the same or similar tail ends. As is already known, the support section 80 extends along a support axis S, enclosing an angle α with the axis of rotation D. This example also shows that the support section 80 indeed need not be arranged perfectly offset with respect to the axis of rotation D, i.e. for example not with its entire outer contour. A support surface 82", not provided with a reference sign in FIG. 7, may also be designed explicitly such that the orientation thereof is kept as exactly as is possible in both mounting states, allowing for an even better arrangement of tail ends, which are the same.

LIST OF REFERENCE SIGNS

10 axle tube
12 tail end
14 longitudinal link
16 axle sub
20 axle connection
40 axle tube receptacle
42 inner surface
44 contour
46 cylinder
48 wrap
60 connecting region
62 continuation
64 connecting plane
80 support section
82', 82" support surface
L longitudinal axis
D axis of rotation
E plane of rotation
S support axis
α angle
β angle of enclosement

The invention claimed is:

1. An axle connection for a utility vehicle, comprising
an axle tube receptacle having a longitudinal axis oriented parallel to an axle tube and arrangeable on the axle tube;
at least one connecting region configured to connect to a longitudinal link; and
a support section configured for the arrangement of a tail end;
wherein the axle connection has an axis of rotation, which intersects the longitudinal axis;
wherein the connecting region is symmetrical with respect to a plane of rotation which is spanned by the axis of rotation and the longitudinal axis;
wherein the support section is offset transversely with respect to the plane of rotation at least in regions;
wherein the axle connection is configured to be arranged on the axle tube in two mounting states, including a first mounting state and a second mounting state;
wherein the first mounting state differs from the second mounting state in that the axle connection is rotated by an angle of about 180° about the axis of rotation; and
wherein the axle connection is configured such that the connecting region is positioned in the same manner in the first mounting state and in the second mounting state.

2. The axle connection of claim 1, wherein the axle tube receptacle comprises a cylinder, which is closed at least in regions and which extends along the longitudinal axis at least in regions.

3. The axle connection of claim 2, wherein the axle tube receptacle comprises a substantially cylindrical wrap, extending along the longitudinal axis at least in regions.

4. The axle connection of claim 3, wherein the axle tube receptacle has at least one of at least one inner surface and at least one lateral contour for arranging at least one of the axle tube and an axle stub.

5. The axle connection of claim 4, wherein the connecting region comprises at least one region of the axle tube receptacle.

6. The axle connection of claim 4, wherein the connecting region comprises a continuation extending along the axis of rotation away from the axle tube receptacle.

7. The axle connection of claim 6, wherein the connecting region and the axle tube receptacle are arranged substantially along the longitudinal axis offset relative to each other.

8. The axle connection of claim 7, wherein the support section is positioned substantially along the longitudinal axis, offset with respect to the axis of rotation.

9. The axle connection of claim 8, wherein the support section extends along a support axis, and wherein the support axis and the axis of rotation form an angle of about 2°-90°.

10. The axle connection of claim 9, wherein the support axis and the axis of rotation form an angle of about 8°-60°.

11. The axle connection of claim 10, wherein the support axis and the axis of rotation form an angle of about 15°-45°.

12. The axle connection of claim 9, wherein with respect to the plane of rotation, an upper support surface relative to the axis of rotation has the same angle in the first mounting state as a lower support surface with respect to the plane of rotation in the second mounting state.

13. The axle connection of claim 12, comprising at least one of an axle tube, an axle stub, a longitudinal link, and a tail end.

14. The axle connection of claim 1, wherein the axle tube receptacle comprises a substantially cylindrical wrap, extending along the longitudinal axis at least in regions.

15. The axle connection of claim 1, wherein the axle tube receptacle has at least one of at least one inner surface and at least one lateral contour for arranging at least one of the axle tube and an axle stub.

16. The axle connection of claim 1, wherein the connecting region comprises at least one region of the axle tube receptacle.

17. The axle connection of claim 1, wherein the connecting region comprises a continuation extending along the axis of rotation away from the axle tube receptacle.

18. The axle connection of claim 1, wherein the connecting region and the axle tube receptacle are arranged substantially along the longitudinal axis offset relative to each other.

19. The axle connection of claim 1, wherein the support section is positioned substantially along the longitudinal axis, offset with respect to the axis of rotation.

20. The axle connection of claim 1, wherein the support section extends along a support axis, and wherein the support axis and the axis of rotation form an angle of about 2°-90°.

21. The axle connection of claim 20, wherein the support axis and the axis of rotation form an angle of about 8°-60°.

22. The axle connection of claim 21, wherein the support axis and the axis of rotation form an angle of about 15°-45°.

23. The axle connection of claim 1, wherein with respect to the plane of rotation, an upper support surface relative to the axis of rotation has the same angle in the first mounting state as a lower support surface with respect to the plane of rotation in the second mounting state.

24. The axle connection of claim 1, comprising at least one of an axle tube, an axle stub, a longitudinal link, and a tail end.

\* \* \* \* \*